2,811,526
1-HETEROCYCLYL-2-DIPHENOXYETHYLIDENI- MINES AND SALTS THEREOF

Robert R. Burtner, Skokie, Ill., assignor, by mesne assignments, to G. D. Searle & Co., Skokie, Ill., a corporation of Delaware No Drawing. Application January 23, 1952, Serial No. 267,929

3 Claims. (Cl. 260—294.7)

The present invention relates to a new group of organic heterocyclic imines and, more particularly, to the α-heterocyclyl-ω-aryloxyalkylidenimines of the structural formula

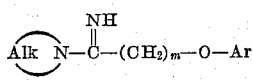

and their salts, wherein Alk represents a lower alkylene radical containing a minimum or 4 and a maximum of 5 carbon atoms in nuclear position, m is an integer between 1 and 6 inclusive, and Ar is an aromatic radical.

In the foregoing structural formula Alk represents a lower alkylene radical containing 4 to 5 carbon atoms in nuclear position. Thus

represents a pyrrolidine or piperidine radical as well as their lower alkyl substitution products such as 2,5-dimethylpyrrolidine and lupetidine. The radical Ar is an aromatic radical containing 6 to 12 carbon atoms. It may be a hydrocarbon such as a phenyl or naphthyl radical; these phenyl and naphthyl radicals may also be substituted by lower alkyl radicals such as methyl, ethyl, straight and branch-chained propyl, butyl, pentyl and hexyl, cyclopentyl, cyclohexyl, methylcyclopentyl, ethylcyclohexyl and the like. The phenyl or naphthyl nuclei may also be substituted by the corresponding lower alkoxy radicals and by halogen radicals.

The imines of this invention are prepared conveniently by the following general method, all symbols having the same meaning as hereinabove. An ω-halogenated alkanonitrile of the type

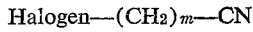

is condensed with a phenol of the type

Ar—OH to form the cyanoalkyl ether of the type

This cyanoalkyl ether is treated with a lower aliphatic alcohol and a strong mineral acid to form the corresponding mineral acid salt of the lower alkyl aryloxyalkanoimidate of the type

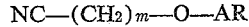

which is then treated with a heterocyclic amine of the type

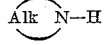

to form the desired α-heterocyclyl-ω-aryloxyalkylidenimine. The organic bases of the foregoing type form salts with a variety of inorganic and strong organic acids including sulfuric, phosphoric, hydrochloric, hydrobromic, sulfamic, citric, oxalic, ascorbic and related acids.

For medicinal purposes it is preferable to use these compounds in the form of their non-toxic salts. The substances of this invention have been shown to possess valuable cardiovascular actions, as well as a pronounced effect on the renal excretory system.

The following examples illustrate in detail certain of the compounds which comprise this invention and typical methods for their production. However, this invention is not to be construed as limited thereby in spirit or in scope. It will be apparent those skilled in the art that many modifications in materials and methods may be made without departing from the invention. In each of these examples temperatures are given in degrees centigrade (°C.), pressures during vacuum distillation in millimeters (mm.) of mercury, and quantities in grams (g.) and milliliters (ml.).

Example 1

A solution of 44 ml. of chloroacetonitrile in 47 ml. of butanone is treated with 1.6 g. of powdered potassium iodide and allowed to stand for 12 hours. The filtered solution is added dropwise over a 90 minute period to a stirred refluxing suspension of 107 g. of o-hydroxydiphenyl and 81.6 g. of potassium carbonate in 110 ml. of butanone. Stirring and refluxing is continued for one hour after which the solvent is removed under vacuum and the residue is taken up in 500 ml. of water and extracted with ether. The ether extract is washed thoroughly with dilute potassium hydroxide to remove the unreacted phenolic compound and finally dried over anhydrous sodium sulfate. After evaporation of the solvent the o-phenylphenoxyacetonitrile is distilled at about 123–128° C. and 0.2 mm. pressure. The colorless oil solidifies on standing to form dense white needles which, recrystallized from cyclohexane, melt at about 45° C.

Example 2

A solution of 104 g. of o-phenylphenoxyacetonitrile and 24.4 g. of absolute ethanol in 305 ml. of chloroform is chilled in an ice bath and treated with a slow stream of anhydrous hydrogen chloride until 19.4 g. are absorbed. The heavy, pasty mass is stored at 0° C. for 15 hours, filtered as well as practicable and then triturated with 500 ml. of anhydrous ether. The hydrochloride of ethyl o-phenylphenoxyacetimidate is collected on a filter, rinsed with ether and dried in vacuum over sodium hydroxide. The almost colorless powder melts at about 145° C. It has the structural formula

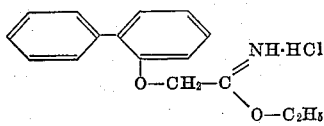

Example 3

A solution of 20.2 g. of the hydrochloride of ethyl o-phenylphenoxyacetimidate and 7.7 g. of piperidine in 87 ml. of absolute ethanol is stored in a stoppered flask at room temperature for 5 days. The solvent is then removed under vacuum and the residue is taken up in an excess of 1% sodium hydroxide and extracted with ether. This ether extract is washed with water, dried and evaporated. The residue is dissolved in anhydrous ether and treated with one equivalent of an anhydrous hydrogen chloride solution in ethanol. The oily hydrochloride granulates on standing. Upon recrystallization from 400 ml. of isopropanol, using charcoal for decolorization, the hydrochloride of 1-piperidyl-2-(o-diphenoxy)-ethylidenimine is obtained in the form of lustrous plates which melt at about 255–256° C. with decomposition. The compound has the structural formula

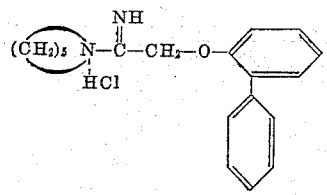

Treatment of 29.1 g. of the hydrochloride of ethyl o-phenylphenoxyacetimidate with 9.5 g. of diethylamine by the same procedure yields the hydrochloride of N,N-diethyl-o-phenylphenoxyacetamidine, which melts at about 204° C. when recrystallized from a mixture of isopropanol and ethyl acetate.

Reaction of 29.1 g. of the hydrochloride of ethyl o-phenylphenoxyacetimidate with a solution of 2.21 g. of ammonia in 35 ml. of absolute ethanol, shaking in a pressure bottle for 40 hours, filtration, rinsing of the precipitate with a small amount of absolute ethanol and concentration of the filtrate yields o-phenylphenoxyacetamidine hydrochloride. The crystals are suspended in about 500 ml. of anhydrous ether, filtered, rinsed, vacuum dried, and crystallized from a mixture of isopropanol and ethyl acetate. The resulting colorless needless melt at about 192° C.

*Example 4*

57.6 g. of 2-naphthol, 28 ml. of chloroacetonitrile and 52 g. of potassium carbonate are reacted by the procedure of Example 1. The 2-naphthoxyacetonitrile thus obtained melts at about 75° C.

A solution of 55.8 g. of this nitrile and 14.8 g. of absolute ethanol in 220 ml. of chloroform is cooled in an ice bath and treated with hydrogen chloride until 11.8 g. are absorbed. After storage at 0° C. for 24 hours the crystals are collected on a filter, washed with a small amount of chloroform, triturated with ether, filtered and vacuum dried. An additional yield can be obtained by concentration of the chloroform filtrate. The hydrochloride of the ethyl 2-naphthoxyacetimidate is obtained in the form of a colorless dusty powder melting at about 119–120° C. with decomposition. It has the structural formula

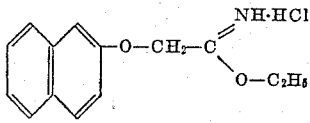

*Example 5*

A solution of 31 g. of ethyl 2-naphthoxyacetimidate hydrochloride and 11 g. of piperidine in 125 ml. of absolute ethanol is stored for 4 days in a stoppered flask at room temperature, after which the solvent is removed under vacuum and the residue is taken up in 500 ml. of water and treated with 5 g. of sodium hydroxide to precipitate the base which is not very soluble in ether. After extraction with a relatively large volume of ether, the ether solution is washed with water, dried over sodium sulfate, filtered and evaporated. The waxy, solid brown residue is dissolved in 150 ml. of warm benzene, filtered with charcoal and treated with one equivalent of absolute alcoholic hydrochloride. The precipitated hydrogen chloride is collected on a filter, rinsed with ether, vacuum dried and crystallized from isopropanol, using charcoal. The 1-piperidyl-2-(2'-naphthoxy)ethylidenimine thus obtained melts at about 195° C. It has the structural formula

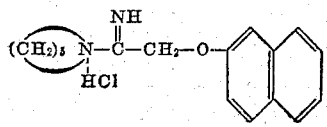

*Example 6*

Reaction of 70.4 g. of o-cyclohexylphenol, 28 ml. of chloroacetonitrile and 52 g. of potassium carbonate by the method of Example 1 yields the o-cyclohexylphenoxyacetonitrile which boils at about 108–112° C. and 0.1 mm. pressure.

A chilled solution of 67 g. of this nitrile and 15.2 g. of absolute ethanol in 67 ml. of chloroform is treated with a stream of hydrogen chloride until 12.2 g. are absorbed. After standing at 0° C. for 24 hours the thick crystalline paste is suspended in about 500 ml. of anhydrous ether. The lumps are crushed and the mixture is filtered. After rinsing with ether and drying, the hydrochloride of ethyl o-cyclohexylphenoxyacetimidate is obtained in almost colorless crystals which melt at about 139–140° C. with decomposition. This salt has the structural formula

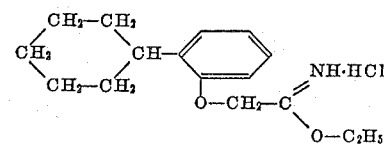

*Example 7*

A solution of 41 g. of ethyl o-cyclohexylphenoxyacetimidate hydrochloride and 12.9 g. of pyrrolidine in 200 ml. of absolute ethanol is stored in a stoppered flask at room temperature for 4 days, after which the solvent is removed under vacuum and the residue taken up in a solution of 8 g. of sodium hydroxide in 1000 ml. of water and extracted with ether. The ether extract is washed with water, dried over anhydrous sodium sulfate and evaporated to yield the 1-pyrrolidyl-2-(o-cyclohexylphenoxy)ethylidenimine as an oil which has the structural formula

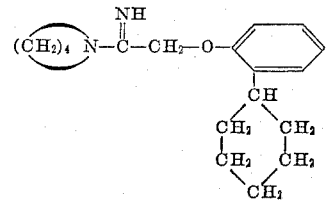

Treatment of 25 g. of the hydrochloride of ethyl o-cyclohexylphenoxyacetimidate with 8 g. of diethylamine by the method above yields the hydrochloride of N,N-diethyl-o-cyclohexylphenoxyacetamidine which, recrystallized from a mixture of isopropanol and ethyl acetate, melts at about 206° C.

Reaction of the hydrochloride of ethyl o-cyclohexylphenoxyacetimidate with absolute alcoholic ammonia by the method of Example 3 yields the o-cyclohexylphenoxyacetamidine hydrochloride which, recrystallized from a mixture of isopropanol and ethyl acetate, forms colorless needles melting at about 196° C.

*Example 8*

Reaction of 48.8 g. of 3,5-dimethylphenol, 28 ml. of chloroacetonitrile and 52 g. of potassium carbonate yields the 3,5-dimethylphenoxyacetonitrile which boils at about 74–77° C. and 0.2 mm. pressure and melts at about 57–58° C.

A solution of 49.5 g. of this nitrile and 15 g. of absolute ethanol in 200 ml. of chloroform is chilled in an ice bath and treated with a slow stream of anhydrous hydrogen chloride until 11.9 g. are absorbed. After storage at 0° C. for 24 hours, the crystalline suspension is diluted with 600 ml. of ether, filtered, rinsed well with ether, and dried in vacuum over sodium hydroxide. The hydrochloride of ethyl 3,5-dimethylphenoxyacetimidate melts at about 125° C. with decomposition. It has the structural formula

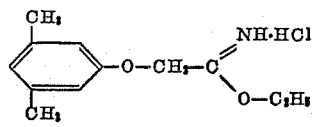

Example 9

A solution of 27.8 g. of the hydrochloride of ethyl 3,5-dimethylphenoxyacetimidate and 11 g. of piperidine in 110 ml. of absolute ethanol is stored in a stoppered vessel at room temperature for 3 days after which the solvent is removed under vacuum and the residue is taken up in 300 ml. of water, treated with 5 g. of sodium hydroxide, and extracted with ether. This extract is washed with water, dried and evaporated at 0.3 mm. pressure, the temperature going up to 80° C. The residue is dissolved in 200 ml. of anhydrous ether and treated with one equivalent of absolute alcoholic hydrogen chloride. The rapidly crystallizing hydrochloride is collected on a filter, rinsed well with ether, dried and recrystallized from a mixture of isopropanol and ethyl acetate. The colorless 1-piperidyl-2-(3,5-dimethylphenoxy)ethylidenimine hydrochloride melts at about 195° C. It has the structural formula

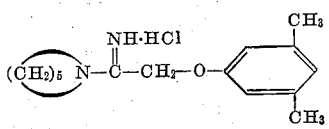

Reaction of 27.8 g. of ethyl 3,5-dimethylphenoxyacetimidate hydrochloride with 9.5 g. of diethylamine by the same procedure yields the hydrochloride of N,N-diethyl-3,5-dimethylphenoxyacetamidine which melts at about 150–151° C. Treatment of ethyl 3,5-dimethylphenoxyacetimidate with absolute alcoholic ammonia by the method of Example 3 yields the hydrochloride of 3,5-dimethylphenoxyacetamidine melting at about 222° C.

Example 10

By reacting 49.6 g. of m-methoxyphenol, 28 ml. of chloroacetonitrile and 52 g. of potassium carbonate, one obtains m-methoxyphenoxyacetonitrile as a colorless oil which distils at about 90–92° C. and 0.25 mm. pressure.

Into a chilled solution of 53.5 g. of this nitrile and 17.5 g. of absolute ethanol in 200 ml. of chloroform, a stream of hydrogen chloride is passed until 13.9 g. have been absorbed. The viscous, pasty reaction product is stored at 0° C. for 12 hours, filtered as well as possible, triturated with 500 ml. of ether, collected on a filter, rinsed with ether and dried in vacuum. The hydrochloride of ethyl m-methoxyphenoxyacetimidate thus obtained melts at about 113° C. with decomposition.

Example 11

A solution of 20 g. of the hydrochloride of ethyl m-methoxyphenoxyacetimidate and 8.95 g. of piperidine in 110 ml. of absolute ethanol is stored in a stoppered flask at room temperature for 5 days. After removal of the solvent under vacuum, the residue is taken up in a solution of 4 g. of sodium hydroxide and 500 ml. of water and extracted with ether. This extract is washed with water, dried over sodium sulfate and evaporated at 10 mm. pressure. The residue is dissolved in 200 ml. of anhydrous ether and the solution is treated with one equivalent of hydrogen chloride in absolute ethanol. The oily hydrochloride granulates on standing. The crystals are collected on a filter, rinsed with ether, dried and recrystallized from a mixture of isopropanol and ethyl acetate. The 1-piperidyl-2-(m-methoxyphenoxy)ethylidenimine hydrochloride is obtained in the form of small white crystals melting at about 155° C. It has the structural formula

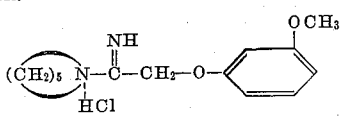

Reaction of 24.5 g. of ethyl m-methoxyphenoxyacetimidate hydrochloride and 9.5 g. of diethylamine by the same procedure yields the hydrochloride of N,N-diethyl-m-methoxyphenoxyacetamidine melting at about 144–145° C. Reaction of 24.5 g. of ethyl m-methoxyphenoxyacetimidate hydrochloride with 2.21 g. of ammonia in absolute alcohol yields the m-methoxyphenoxyacetamidine hydrochloride melting at about 136° C.

Example 12

Reaction of 79.3 g. of 5-methoxy-1-naphthol, 32 ml. of chloroacetonitrile and 59.3 g. of potassium carbonate by the method of Example 1 yields 5-methoxy-1-naphthoxyacetonitrile melting at about 95–96° C.

A solution of 57.5 g. of this nitrile, 13.2 g. of absolute ethanol and 200 ml. of dioxane is chilled in an ice bath and treated with hydrogen chloride gas until 10.4 g. are absorbed. After storage for 20 hours at 0° C. the mixture is filtered and the filter cake pressed dry, triturated with about 500 ml. of anhydrous ether, filtered, rinsed with ether and dried. The hydrochloride of the ethyl 5-methoxy-1-naphthoxyacetimidate sinters at about 130° C. and melts at about 186–188° C.

Example 13

A suspension of 26.5 g. of the hydrochloride of ethyl 5-methoxy-1-naphthoxyacetimidate and 9.9 g. of piperidine in 110 ml. of absolute ethanol is shaken in a stoppered flask for 3 days after which the crystalline precipitate is collected on a filter and rinsed with a small quantity of cold absolute ethanol. A solution of these crystals in 250 ml. of warm absolute alcohol is treated with one equivalent of absolute alcoholic hydrogen chloride and chilled in the ice bath. The precipitated crystals are collected on a filter, rinsed with absolute alcohol and dried. One thus obtains colorless crystals of 1-piperidyl-2-(5-methoxy-1-naphthoxy)ethylidenimine hydrochloride melting at about 235° C. with decomposition. A further yield can be obtained by work-up of the original alcoholic filtrate. The product has the structural formula

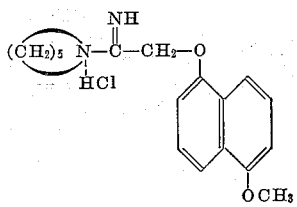

Example 14

A solution of 26.5 g. of the hydrochloride of ethyl 4-chloro-3-methylphenoxyacetimidate and 9 g. of pyrrolidine in 120 ml. of absolute ethanol is stored in a stoppered vessel at room temperature for 4 days and then concentrated in vacuum. The residue is taken up in a solution of 5 g. of sodium hydroxide in 300 ml. of water and extracted with ether. This extract is washed with water, dried over anhydrous sodium sulfate, stirred with decolorizing charcoal, filtered and evaporated, leaving as a residue the light amber, oily 1-pyrrolidyl-2-(4'-chloro-3'-methylphenoxy)ethylidenimine which has the structural formula

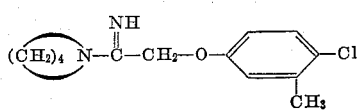

Example 15

A solution of 11.5 g. of sodium in 500 ml. of absolute ethanol is treated with 54 g. of o-cresol and the solvent is removed under vacuum at 10 mm. pressure. To a suspension of the dry residue in 500 ml. of anhydrous toluene, 76 g. of α-chlorophenylacetonitrile are added dropwise with stirring at reflux temperature. Stirring and heating at reflux temperature is continued for 9 hours, after which the sodium chloride is filtered off and the filtrate is washed first with a 5% aqueous sodium hydroxide solution and then with water. The solvent is stripped and the α-(o-cresoxy)phenylacetonitrile is distilled at about 116–121° C. and 0.25 mm. pressure.

To a solution of 32 g. of this nitrile in 100 ml. of chloroform, 7 g. of absolute ethanol are added and a slow stream of hydrogen chloride is passed through the solution at 0° C. until 5.55 g. are absorbed. After storage at 0° C. for 2 days, most of the solvent is removed under vacuum and 400 ml. of anhydrous ether are added to the viscous residue, producing complete solution. Storage at 0° C. causes precipitation of white crystals which are collected on a filter, rinsed well with ether, dried in vacuum, triturated with 300 ml. of anhydrous ether and re-dried. The α-(o-cresoxy)-α-phenylacetimidate hydrochloride thus obtained melts at about 120–121° C. with decomposition.

*Example 16*

A solution of 27.5 g. of α-(o-cresoxy)-α-phenylacetimidate hydrochloride and 10 g. of piperidine in 120 ml. of absolute ethanol is stored in a stoppered flask at room temperature for 6 days and then concentrated under vacuum. The resulting yellow crystalline mass is taken up in a solution of 10 g. of sodium hydroxide in 500 ml. of water and extracted with ether. This extract is washed with water, dried and concentrated at 10 mm. pressure leaving a yellow solid residue, which is dissolved in 500 ml. of warm anhydrous ether and treated with one equivalent of absolute alcoholic hydrogen chloride. The initially viscous yellow precipitate crystallizes on standing at 0° C. These crystals are ground, collected on a filter, rinsed with ether, dried and recrystallized from absolute alcohol. The hydrochloride of 1-piperidyl-2-phenyl-2-(o-toloxy)-ethylidenimine is thus obtained in the form of white crystals melting at about 241–242° C. with decomposition. It has the structural formula

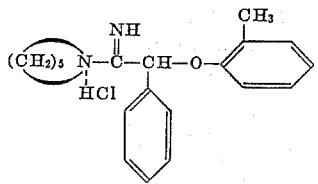

*Example 17*

By reaction of 49.7 g. of o-thiocresol, 28 ml. of chloroacetonitrile and 52 g. of potassium carbonate by the method of Example 1, o-tolylmercaptoacetonitrile is obtained which distils at about 88–90° C. and 0.15 mm. pressure.

A solution of 47.8 g. of this nitrile and 14.3 g. of absolute ethanol in 75 ml. of chloroform is chilled in an ice bath and treated with a moderate stream of hydrogen chloride until 11.3 g. are absorbed. The clear yellow solution is stored at 0° C. for 12 hours and concentrated under vacuum until the product becomes a crystalline paste. This paste is suspended in 500 ml. of anhydrous ether, ground, filtered and rinsed with anhydrous ether. The ethyl o-tolylmercaptoacetimidate hydrochloride thus obtained melts at about 117° C. with decomposition. It has the structural formula

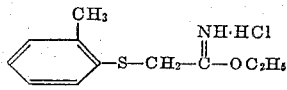

*Example 18*

A solution of 21 g. of ethyl o-tolylthioacetimidate hydrochloride and 9.5 g. of piperidine in 112 ml. of absolute ethanol is stored at room temperature in a stoppered flask for 4 days and then concentrated in vacuo. The resulting crystalline residue is taken up in 500 ml. of a 1% sodium hydroxide solution and extracted with ether. This extract is washed with water, dried and concentrated in vacuum. 20.5 g. of the oily 1-piperidyl-2-(o-tolylthio)ethylidenimine are dissolved in 300 ml. of anhydrous ether and treated with one equivalent of absolute ethanolic hydrogen chloride. The viscous hydrochloride soon crystallizes. It is ground, filtered, rinsed with ether, dried and crystallized from a mixture of isopropanol and ethyl acetate, using charcoal as a decolorizing agent. The colorless crystals of the hydrochloride thus obtained melt at about 169° C.

I claim:

1. The salts of the organic compounds of the structural formula

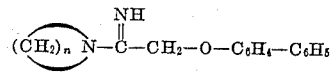

wherein —C$_6$H$_4$—C$_6$H$_5$ is a biphenyl radical and $n$ is an integer greater than 3 and smaller than 6.

2. The salts of the organic compounds of the structural formula

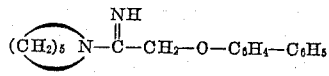

wherein —C$_6$H$_4$—C$_6$H$_5$ is a biphenyl radical.

3. The salts of the organic compounds of the structural formula

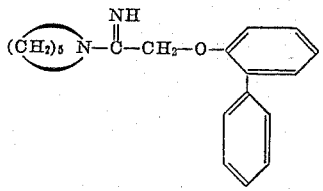

References Cited in the file of this patent

UNITED STATES PATENTS

| | | |
|---|---|---|
| 2,131,141 | Miescher | Sept. 27, 1938 |
| 2,149,457 | Miescher | Mar. 7, 1939 |

FOREIGN PATENTS

| | | |
|---|---|---|
| 204,761 | Switzerland | Sept. 1, 1939 |

OTHER REFERENCES

Craver et al.: Journal of Pharmacology and Experimental Therapy, volume 99, pages 353–361, 1950.